United States Patent [19]
Pivar

[11] 3,841,821

[45] Oct. 15, 1974

[54] APPARATUS FOR THE ROTATIONAL MOLDING OF THERMOPLASTIC ARTICLES

[75] Inventor: Stuart Pivar, Muttontown, L. I., N.Y.

[73] Assignee: Rototron Corporation, Farmingdale, N.Y.

[22] Filed: June 26, 1972

[21] Appl. No.: 265,997

[52] U.S. Cl. .............................................. 425/434
[51] Int. Cl. .................................................. B29c 5/04
[58] Field of Search ........ 425/174, 174.4, 234, 425, 425/429, 430, 433, 434, 435, DIG. 208

[56] References Cited
UNITED STATES PATENTS

| | | | |
|---|---|---|---|
| 2,603,836 | 7/1952 | Rempel | 425/430 |
| 2,826,869 | 3/1958 | Lerch | 425/434 X |
| 2,961,703 | 11/1960 | Pinotti | 425/430 |
| 3,362,098 | 1/1968 | Olsen et al. | 425/429 X |
| 3,510,911 | 5/1970 | Alter | 425/435 |
| 3,676,037 | 7/1972 | Pivar | 425/434 X |

Primary Examiner—Robert D. Baldwin
Assistant Examiner—John E. Roethel
Attorney, Agent, or Firm—Roberts & Cohen

[57] ABSTRACT

A technique is provided for molding a plurality of pan-shaped plastic articles simultaneously. This is done by arranging open pan-shaped molds coaxially along an inclined axis with a rectangular frame supported on shafts inclined at about 45°. Plastic poured into the individual molds is fused by a burner arranged below the frame and parallel to said axis.

7 Claims, 3 Drawing Figures

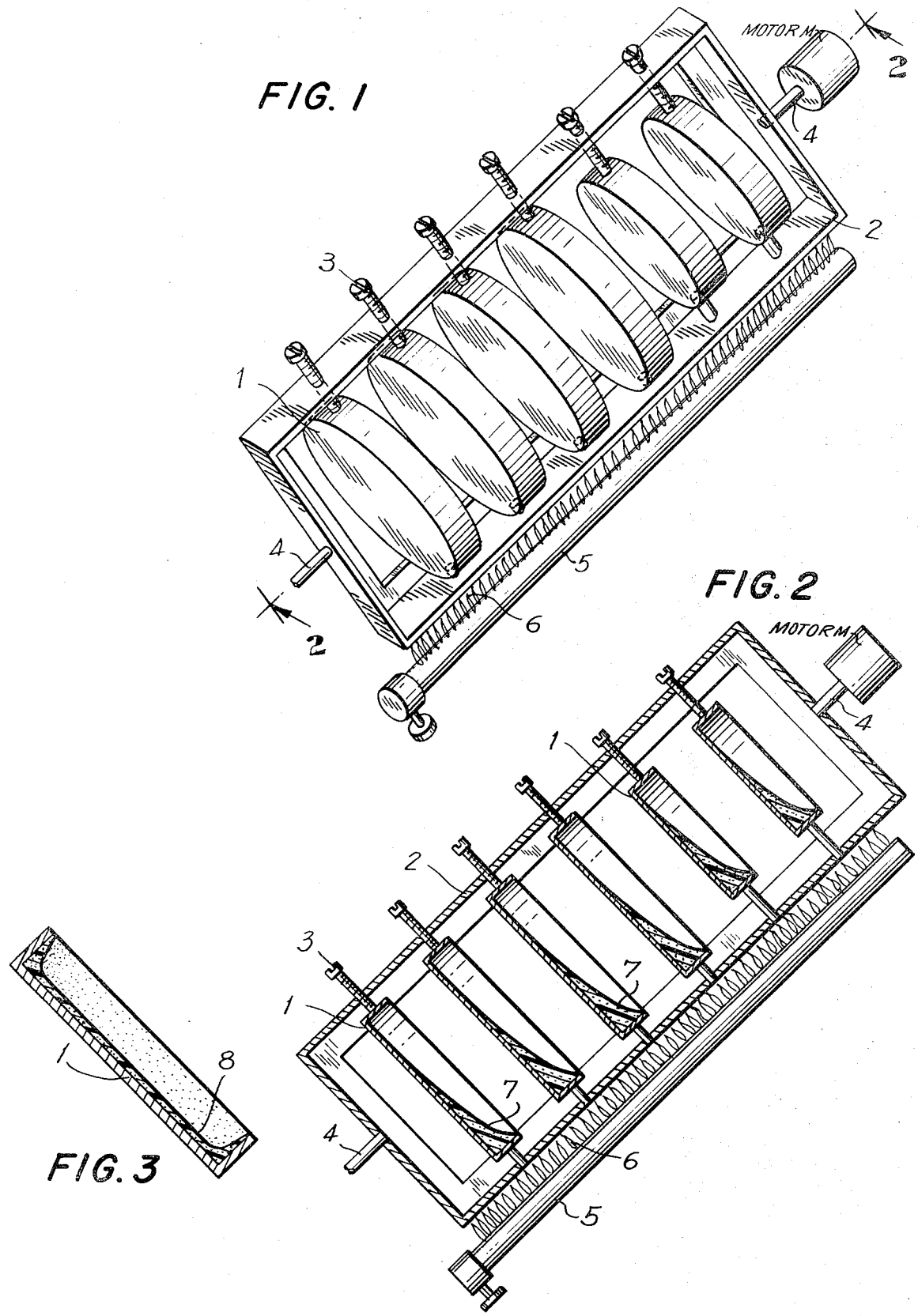

APPARATUS FOR THE ROTATIONAL MOLDING OF THERMOPLASTIC ARTICLES

FIELD OF INVENTION

This invention relates to thermoplastic molding and more particularly to the simultaneous molding of a plurality of articles.

BACKGROUND

Rotational molding is a well known plastic molding technique in which hollow articles are molded in heated hollow metal molds which are supported for multi-axial rotation. Such molds are generally made of welded, cast or electro-formed metal and are usually manufactured in two sections which can be taken apart so as to enable charging the molds and removing the finished articles.

Molds of the aforesaid type can be supported for rotation generally about two mutually perpendicular axes. A mold may be heated during rotation in one of a variety of ways. It can be jacketed by an outer wall thereby creating a space through which hot liquid and cold liquid is alternately caused to flow. It can be rotated inside a heating oven. Furthermore it can be rotated with gas or electric heaters located contiguous to its surface.

Molds for rotation molding tend to be costly due to the need to provide tight closures for the same and due to the need to provide for means to affix the same to a rotating mechanism. Machinery to perform rotational molding is costly owing to the need to support molds which are relatively heavy and to subject the same to the complex motion of bi-axial rotation. Further, the operation of a rotational molding machine entails high labor costs due to the need to provide for manually opening and closing the molds.

SUMMARY OF THE INVENTION

An object of this invention is to provide improved means to rotationally mold certain articles such as large covers for containers or other pan-shaped articles while making use of simplified molds and of simplified machines.

Another object of the invention is to provide improved means and techniques for the simultaneous molding of a plurality of pan-shaped articles.

To achieve the above and other objects of the invention, there is provided a molding apparatus comprising a plurality of at least substantially parallel molds with means to support these molds and rotate the same about a single common axis, there being furthermore provided a heat source located below said molds and supplying a flow of heat between and around these molds.

The molds are, according to a preferred embodiment of the invention, preferably open pan-shaped molds. The means to support the molds are preferably formed as an open frame adapted for internally supporting the molds, there being provided fasteners releasably holding the molds within the frame and shafts rotatably supporting the frame and arranged in inclined coaxial attitude.

The aforenoted heat source may be a gas burner located adjacent said frame and is fixed independently of the rotation of the frame, the burner being parallel to the aforenoted axis.

According to a further feature of the invention the aforenoted frame is a rectangular frame of channelled metal and the aforesaid fasteners are screws diametrically engaging respective of said molds. The molds may furthermore be coaxial with the aforesaid shafts. Preferably, the axis is inclined at about 45°.

According to the method of the invention, there is provided a method of molding pan-shaped plastic articles comprising arranging a plurality of open pan-shappd molds in coaxial relation and rotating the same and pouring thermoplastic powder into each of the molds while heating the same from below. Other objects and features as well as advantages of the invention will be found in the following detailed description as illustrated in the accompanying drawing.

BRIEF DESCRIPTION OF THE DRAWING

FIG. 1 is a diagrammatic perspective view of an apparatus according to one embodiment, for using the method of the invention;

FIG. 2 is an elevational view of the same in cross-section; and

FIG. 3 is an elevational cross-sectional view of a mold containing a finished part.

DETAILED DESCRIPTION

FIG. 1 shows a plurality of coaxially arranged open pan-shaped molds having no covers which are each removably attached to a rectangular frame 2 of steel angles by means of screw fasteners 3 of variable length. The frame 2 is attached to shafts 4 which are disposed at an angle of about 45° to the horizontal and which are mounted for rotation by motor M.

A gas burner 5 is mounted in a fixed position generally beneath the apparatus and is disposed parallel to the axis of the shafts 4 and molds. Flames 6 which heat the molds 1 are generated by the burner.

FIG. 2 shows thermoplastic molding material 7 which is a plastic powder or granular material which has been poured into the molds 1 at the lowermost portions thereof. A finished molded part 8 is shown in FIG. 3 within a mold 1.

The operation of the process consists of the following steps:

A pre-weighed charge of plastic molding material such as polyethylene powder is poured into each of the molds 1. The apparatus is caused to rotate slowly so that the material is distributed about the inside surface of the molds. The apparatus supports the molds at an angle of about 45° which prevents the material from spilling out in the absence of a retaining lip or cover.

The burner 5 is ignited. Flames 6 are generated which cause a current of hot air to rise against the outer surfaces of the molds. Although the flames are not contiguous with the outer surfaces of the molds, the outer surfaces are heated evenly since these surfaces closest to the flame have a shorter exposure to the flame because they have a greater linear speed. Although the center of these molds is relatively distant from the flames, the finished part is no thinner in the center than elsewhere. This is one of the principle advantages of this invention. In other flame molding apparatus, there is always a burner arranged contiguously. However, to arrange a burner in position to cook the bottom of these molds would prevent the ganging of the molds since the frame would be in the way.

Heating is continued until all the molding material has fused to the inner surfaces of the molds. At this time, the flames are turned off and the molds are allowed to cool. They cool very quickly since they have no covers. When the articles within have congealed and are cool, rotation is stopped and the articles are each pulled out of the mold manually and the operation is repeated. The parts can subsequently be trimmed to size if necessary.

The invention has several surprising features with respect to the non-contiguous flames. It is very surprising that one can make a part with the heat so far away from the middle of the molds. The molds for example can be 24 inches in diameter. Further, to avoid using cross burners makes it possible to gang the molds. Thus, this new machine is extremely productive and convenient since it makes up to eight or more parts at a time with no special attention and no need to handle mold covers. Another aspect of the invention is the absence of covers or even a retaining ring as it has been discovered that it is possible to cause even distribution of the plastic material at an angle which does not allow the powder to spill over. A further aspect is the absence of motion in any other axis. In other words, it has been discovered that it is possible to get even distribution with monoaxial rotation. This makes the machine extremely simple to build.

Thus, as has been shown above, the invention provides a molding apparatus comprising a plurality of at least substantially parallel molds with means to support these molds and rotate the same about a single common axis, there being furthermore provided a heat source located below said molds and supplying a flow of heat between and around said molds.

As has been noted the molds are open pan-shaped molds and the aforenoted means includes an open frame adapted for internally supporting said molds, there being furthermore provided fasteners releasably holding said molds within the frame and shafts rotatably supporting said frame and arranged in inclined coaxial attitude.

The aforenoted heat source is as has been shown, a gas burner located adjacent the frame and is fixed independently of the rotation of the frame, the burner being preferably parallel to the aforesaid axis.

As has been noted, the frame is preferably a rectangular frame of channelled metal and the fasteners are preferably screws diametrially engaging respective of the molds. The molds may be coaxially disposed with the aforesaid shafts and the aforesaid axis may be preferably inclined at about 45°.

It has also been shown that the method of the invention consists of molding pan-shaped plastic articles comprising arranging a plurality of open pan-shaped molds in coaxial relation and rotating the same and pouring thermoplastic powder into each of the molds while heating the same from below.

There will now be obvious to those skilled in the art, many modifications and variations of the method and structures set forth hereinabove. Such modifications and variations will not depart from the scope of the invention if defined by the following claims:

I claim:

1. Molding apparatus comprising a plurality of at least substantially parallel molds, means to engage the molds peripherally to support said molds in spaced relation and to rotate the same about a single common axis, and a heat source located below said molds and supplying a flow of heat between and around said molds, said molds being open pan-shaped molds.

2. Apparatus as claimed in claim 1 wherein said means includes an open frame adapted for internally supporting said molds, fasteners releasably holding said molds within said frame, and shafts rotatably supporting said frame and arranged in inclined coaxial attitude.

3. Apparatus as claimed in claim 2 wherein said heat source is a gas burner located adjacent said frame and is fixed independently of the rotation of said frame, said burner being parallel to said axis.

4. Apparatus as claimed in claim 2 wherein said frame is a rectangular frame of channelled metal.

5. Apparatus as claimed in claim 2 wherein said fasteners are screws diametrally engaging respective of said molds.

6. Apparatus as claimed in claim 2 wherein said molds are coaxial with said shafts.

7. Apparatus as claimed in claim 3 wherein the axis and burner are inclined at about 45° to the horizontal.

* * * * *